(12) United States Patent
Gordon

(10) Patent No.: US 6,830,297 B2
(45) Date of Patent: Dec. 14, 2004

(54) SUSPENSION SEAT

(75) Inventor: Lewis Gordon, Smithfield (AU)

(73) Assignee: G and J Lewis Enterprises PTY LTD, Smithfield (AU)

( * ) Notice: Subject to any disclaimer, the term of this patent is extended or adjusted under 35 U.S.C. 154(b) by 0 days.

(21) Appl. No.: 10/169,481

(22) PCT Filed: Jan. 4, 2001

(86) PCT No.: PCT/AU01/00006
§ 371 (c)(1),
(2), (4) Date: Nov. 1, 2002

(87) PCT Pub. No.: WO01/49520
PCT Pub. Date: Jul. 12, 2001

(65) Prior Publication Data
US 2003/0132658 A1 Jul. 17, 2003

(30) Foreign Application Priority Data
Jan. 4, 2000 (AU) .............................................. 10003/00

(51) Int. Cl.⁷ .............................. B60N 2/04; B60N 2/42
(52) U.S. Cl. ............................ 297/344.12; 297/216.17; 297/452.55; 248/580; 248/589
(58) Field of Search ............................ 297/353, 452.55, 297/452.54, 216.17, 344.12, 339; 248/580, 589

(56) References Cited

U.S. PATENT DOCUMENTS 3,632,167 A * 1/1972 Sinfield ....................... 297/307
5,251,864 A * 10/1993 Itou ....................... 297/344.12
5,520,440 A 5/1996 Lee
5,601,338 A * 2/1997 Wahls ............... 297/452.55 X
5,871,198 A 2/1999 Bostrom et al.

FOREIGN PATENT DOCUMENTS

DE 251 109 A1 11/1987

* cited by examiner

Primary Examiner—Anthony D. Barfield
(74) Attorney, Agent, or Firm—Stites & Harbison PLLC; Douglas E. Jackson

(57) ABSTRACT

A suspension seat arrangement (1) comprising a lower frame (2) mountable to a seat mounting, an upper frame (3) connected to the lower frame (2) and movable with respect thereto, the upper frame (3) being arranged to mount a seat base (16), and a suspension arrangement (12) suspending the upper frame (3) with respect to the lower frame (2), the upper frame (3) and lower frame (2) arrangement being such that the upper frame (3) is able to move downwardly relative to the lower frame (2) so that the upper frame (3) and lower frame (2) become nested together one within the other. In another embodiment a suspension seat arrangement comprising a suspension adjustment mechanism for adjusting the tension of the suspension. In a further embodiment a suspension seat arrangement comprising a cover arrangement to encapsulate the suspension arrangement.

10 Claims, 6 Drawing Sheets

SUSPENSION SEAT

The present invention relates to a suspension seat, and particularly, but not exclusively, to a suspension seat for a vehicle.

It is known to provide vehicle seats with their own suspension arrangements, such seats are known as "suspension seats". These seats are particularly useful in vehicles which are subject to rough conditions, such as industrial vehicles, military vehicles and off-road vehicles. The idea is to provide the seat with suspension independent to the vehicle suspension, to improve comfort of the user. In some circumstances, suspension seats may be a necessity in order to enable the user to be able to control the vehicle in rough conditions.

A problem with fitting a suspension seat in confined spaces such as found in a vehicle is that the suspension arrangement requires additional space, either underneath the seat or behind the seat, and in many vehicles, space is at a premium.

The present invention provides a suspension seat arrangement, comprising a lower frame which is mountable to a seat mounting, an upper frame connected to the lower frame and movable with respect thereto, the upper frame being arranged to mount a seat base, and a suspension arrangement suspending the upper frame with respect to the lower frame, the upper frame and lower frame arrangement being such that the upper frame is able to move downwardly relative to the lower frame so that the upper frame and lower frame become nested together on within the other.

Preferably, the upper frame is able to move downwardly over the lower frame. Because of this, the height of the base of the vehicle seat is preferably minimised and the space required of the seat base is therefore also minimised, whilst still allowing for adequate travel of the upper frame with respect to the lower frame to provide adequate energy absorption by the suspension arrangement. The arrangement can therefore be fitted to a vehicle, for example, maximising the use of the available space.

Preferably, the suspension arrangement is mounted at the back of the seat, preferably, the arrangement has a relatively thin cross section so that the width of the back of the seat is minimised.

The tension of the suspension arrangement is preferably adjustable, preferably by a mechanism adjustable from the side of the seat back.

Preferably, a cover mounted over the suspension arrangement has the advantage of reducing the likelihood of injury to a passenger who may be seated behind the suspension arrangement or the passenger seated in the seat.

The seat base may include a cushion mounted on the upper frame, and preferably a resilient platform is mounted to the upper frame to mount the cushion, to allow additional energy absorption in conjunction with the suspension arrangement.

The lower frame, upper frame and suspension arrangement may be provided on their own, and a complete seat assembly (perhaps a seat originally fitted to a vehicle, for example) can be mounted to the upper frame (eg by bolting). In this way, the seat already in the vehicle can be provided with suspension by utilising a suspension seat arrangement in accordance with the present invention and mounting the original seat to the upper frame. Because of the advantageously minimised dimensions of the suspension seat arrangement of the present invention, this can be done without taking up too much space in the interior of the vehicle.

The present invention further provides a method of modifying a seat to provide suspension to the seat, comprising the step of mounting the seat to a suspension seat arrangement as discussed above.

The present invention further provides a suspension seat arrangement comprising a lower frame which is mountable to a seat mounting, an upper frame which is movable in respect to the lower frame, and a suspension arrangement connected between the upper frame and the lower frame suspending the upper frame with respect to the lower frame, the suspension arrangement including a suspension adjustment mechanism, for adjusting the tension of the suspension, the suspension adjustment mechanism including a mechanism adjustment control which is adjustable from the side of the seat.

The present invention yet further provides a suspension seat arrangement comprising a lower frame which is mountable to the seat mounting, an upper frame movable with respect to the lower frame and a suspension arrangement connected between the upper frame and the lower frame and suspending the upper frame with respect to the lower frame, a cover arrangement being provided to encapsulate the suspension arrangement, the cover arrangement comprising a housing which encapsulates the suspension arrangement.

Features and advantages of the present invention will become apparent from the following description of an embodiment thereof, by way of example only, with reference to the accompanying drawings, in which.

Figure 1:
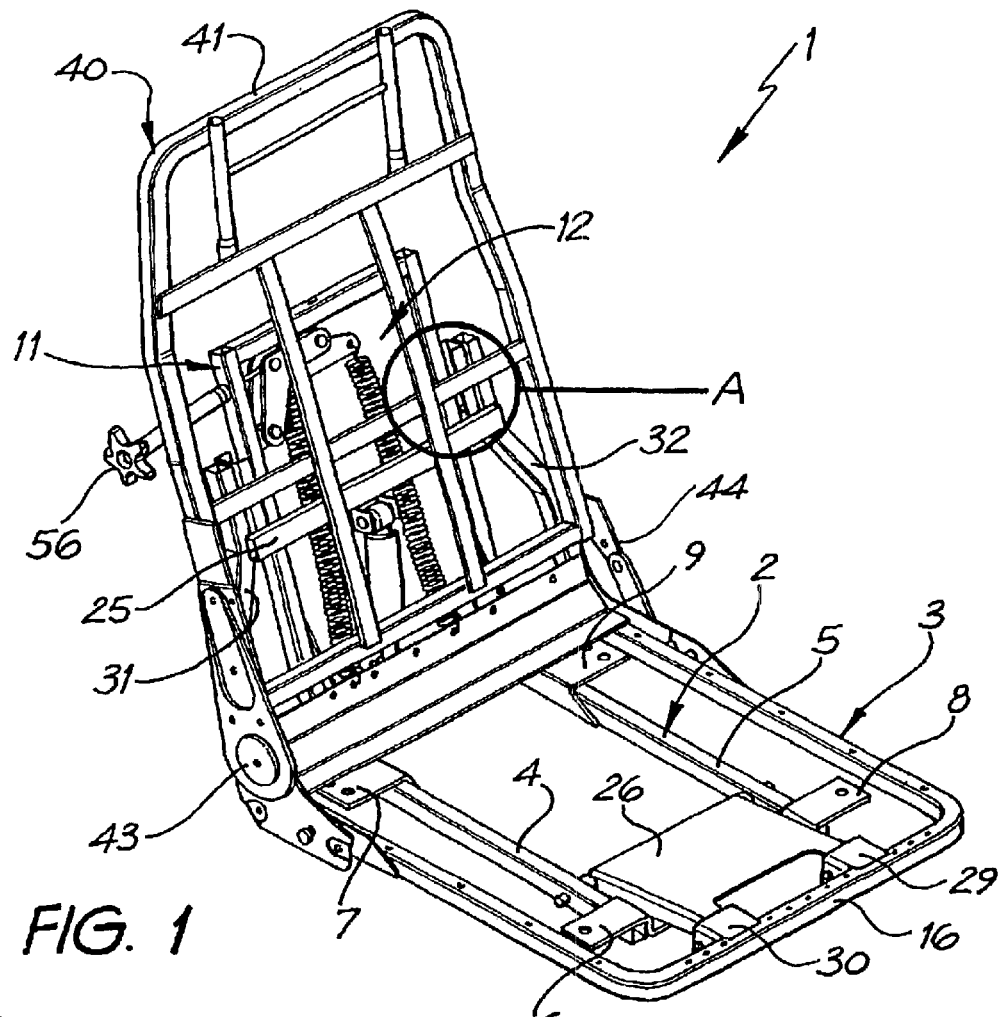
FIG. 1 is a perspective view from above and one side of a suspension seat arrangement in accordance with an embodiment of the present invention.
Figure 2:
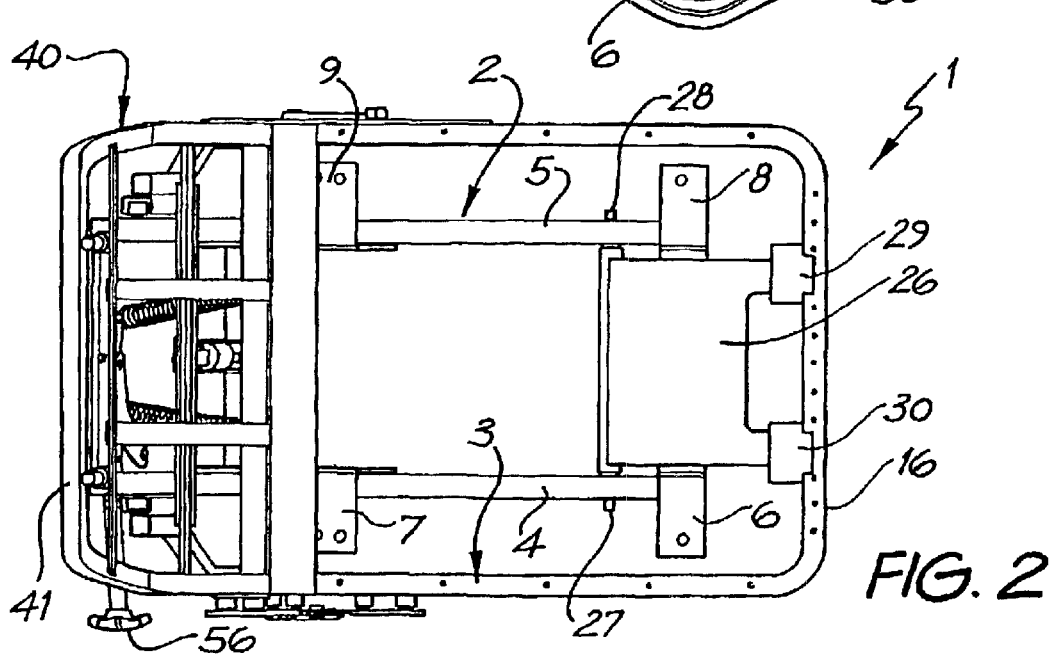
FIG. 2 is a view from above of the suspension seat of FIG. 1.
Figure 3:
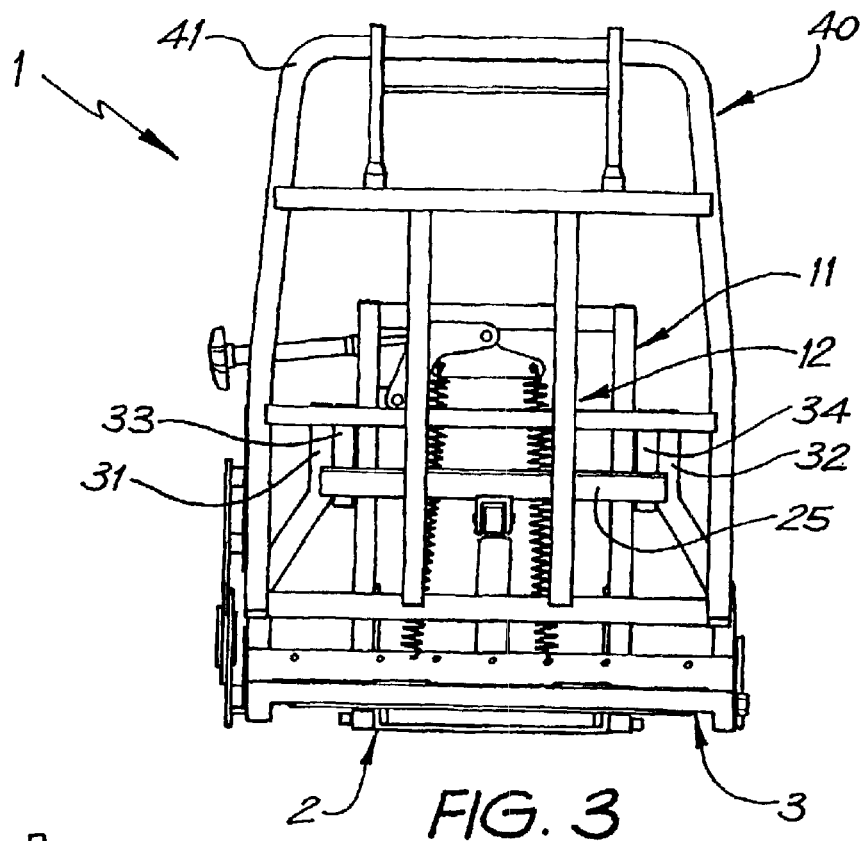
FIG. 3 is a view from the front of the suspension seat of FIG. 1.

Referring firstly to FIGS. 1–5, an embodiment of a suspension seat arrangement in accordance with the present invention is illustrated and generally designated by reference numeral 1. Please note that in these drawings, not all reference numerals have been shown on each figure, for purposes of clarity. Similarly for FIGS. 6 through 10. Reference numerals are distributed through the drawings according to which of the drawings gives the clearest view for the particular aspect of the suspension seat arrangement. The suspension seat arrangement 1 comprises a lower frame 2 and an upper frame 3. In this example, the lower frame 2 is made up of a "skeleton" of components including lower frame bars 4, 5, brackets 6, 7, 8, 9 for mounting seat runners (not shown) for longitudinal travel with respect to a seat mounting eg in a vehicle. At the back of the lower frame 2, a cross bar 10 connects the bars 4 and 5 and also mounts a suspension sub-frame 11 mounting a suspension arrangement 12, which will be described in more detail later. Suspension sub-frame 11 comprises two upwardly extending bars 13 and 14 and a top cross bar 15. The suspension sub-frame 11 extends upwardly at the back of the seat arrangement 1.

The upper frame 3, in this embodiment is arranged to mount a seat base and comprises a cushion frame 16 formed of a bar bent to form three sides of a rectangle which, in operation in this embodiment (not shown), mounts a seat base in the form of springs or webbing for supporting a cushion. At the back of the cushion frame 16, a cross bar 17 is provided, which is raised with respect to the cushion frame 16.

The suspension arrangement 12, in this embodiment, comprises a suspension linkage arrangement 18, which will be described in more detail later, which mounts one end each of a pair of suspension springs 19, 20. The other ends of the suspension springs 19, 20 are connected to the cross bar 17. The suspension linkage arrangement 18 is mounted to the suspension sub-frame 11. Suspension springs 19, 20 therefore suspend the upper frame 3 with respect to the lower frame 2, such that downward movement of the upper frame 3 with respect to the lower frame 2 is resisted by the suspension springs 19, 20.

The suspension arrangement 12 also includes a damper 21, which in this example is a gas piston 22 and cylinder 23 arrangement. One end 24 of the damper 21 is mounted to a further cross bar 25 which is mounted via other components (to be described later) to the upper frame 3. The other end 24A of the damper 21 is mounted to cross bar 10 of the lower frame 2. Damper 21 damps motion between the upper frame 3 and lower frame 2.

The suspension arrangement 12, the upper frame 3 and lower frame 2 are also connected by a front link 26. The front link 26 consists of a plate, at one end of which bushes 27, 28 formed by ends at a shaft mounted in the front link fit through holes in bars 4 and 5 respectively of the lower frame 2. At the other end, the front link 26 mounts hinges 29, 30 fixed to the cushion frame 16, the front link 26 thus allowing for relative upwards and downwards travel between the lower frame 2 and upper frame 3.

Figure 10:
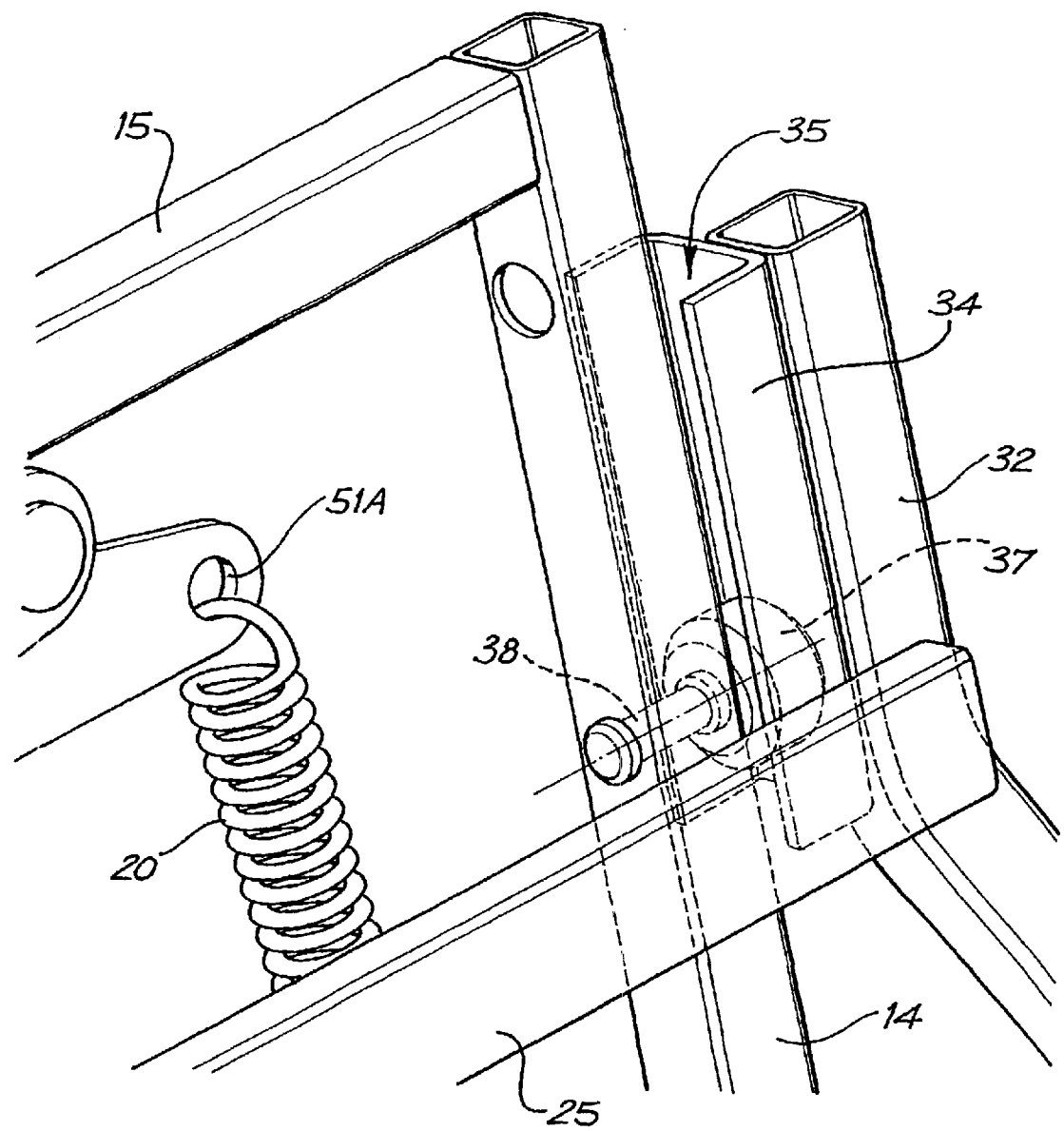
FIG. 10 is a detail on A (FIG. 1) showing the suspension roller arrangement of the embodiment of FIG. 1.

The upper frame 3 also mounts a pair of arms 31, 32, extending from the cross bar 17 at the back of the seat arrangement. The ends of the arms 31, 32 distal from the cross bar 17 mount roller channel members 33, 34 which provide channels 35, 36 within which rollers can move. FIG. 10 shows a detail of the channel member 34 showing a roller 37 riding within channel 35. Roller 37 is mounted to an axle 38 which is mounted to bar 14 of the suspension sub-frame 11. A similar roller arrangement (not shown) is provided for riding in channel 36, and is mounted to bar 13 of suspension sub-frame 11.

The front link 26 and the roller and channel members 33, 34 ensure that relative movement between the upper frame 3 and lower frame 2 is in a controlled manner.

Cross bar 25 connects channel members 34 and 33 and therefore arms 31, 32, connected to the upper frame 3.

In this embodiment, seat back 40 is mounted to the upper frame 3 and comprises a seat back frame 41 which is bent to form three sides of an approximate rectangle, and is connected to crossbar 17. The seat back is hinged by hinges 43, 44 to the upper frame 3, to enable adjustment of relative angle between the seat back 40 and the upper frame 3 so that the seat can be reclined.

Figure 4:
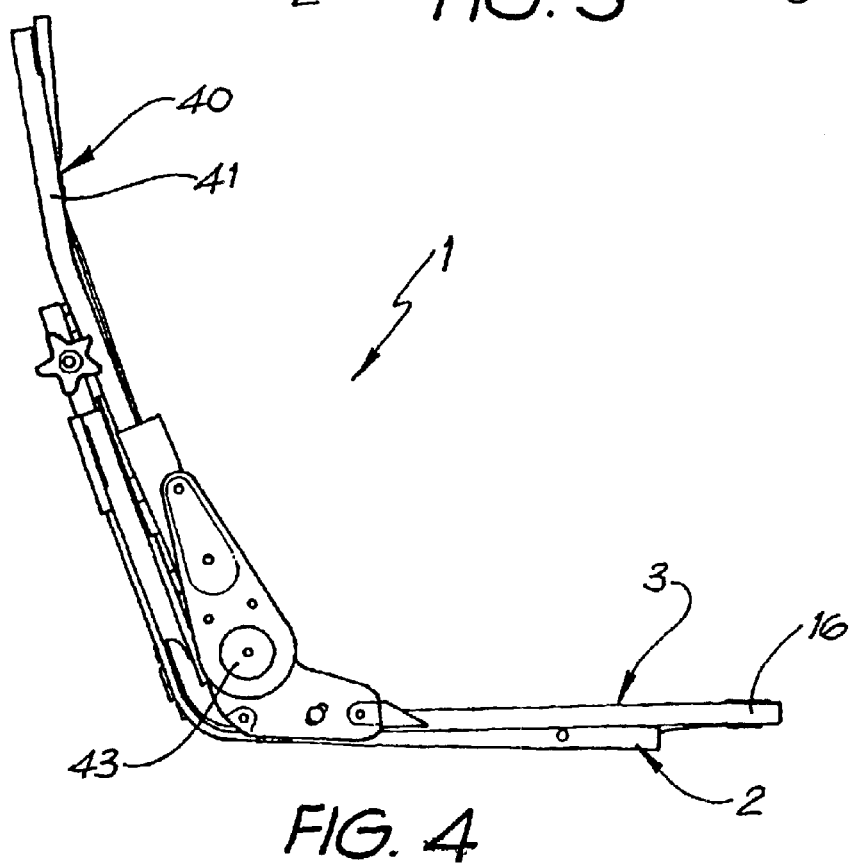
FIG. 4 is a view from the side of the suspension seat of FIG. 1.
Figure 5:
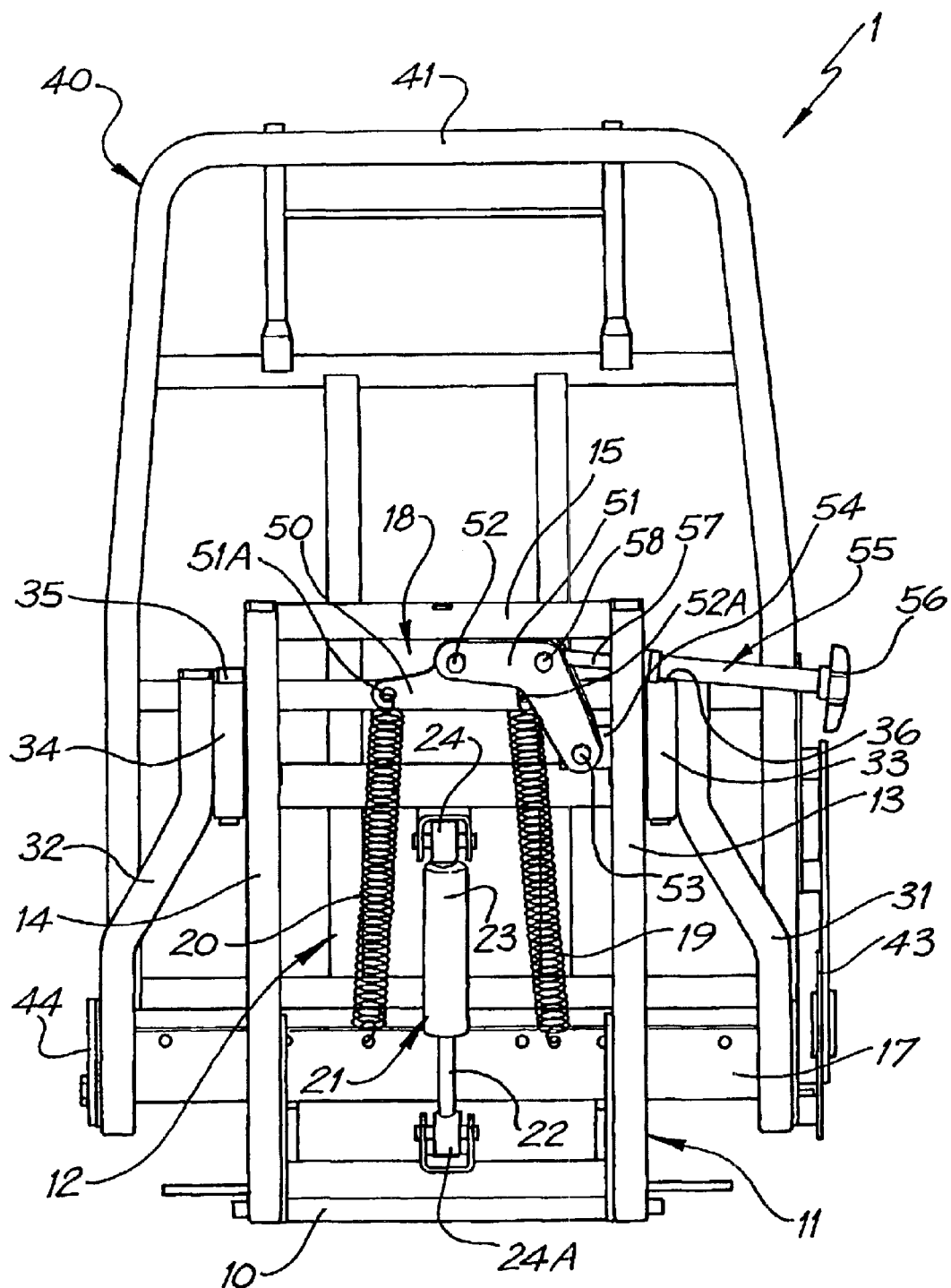
FIG. 5 is a rear view of the suspension seat of FIG. 1.
Figure 6:
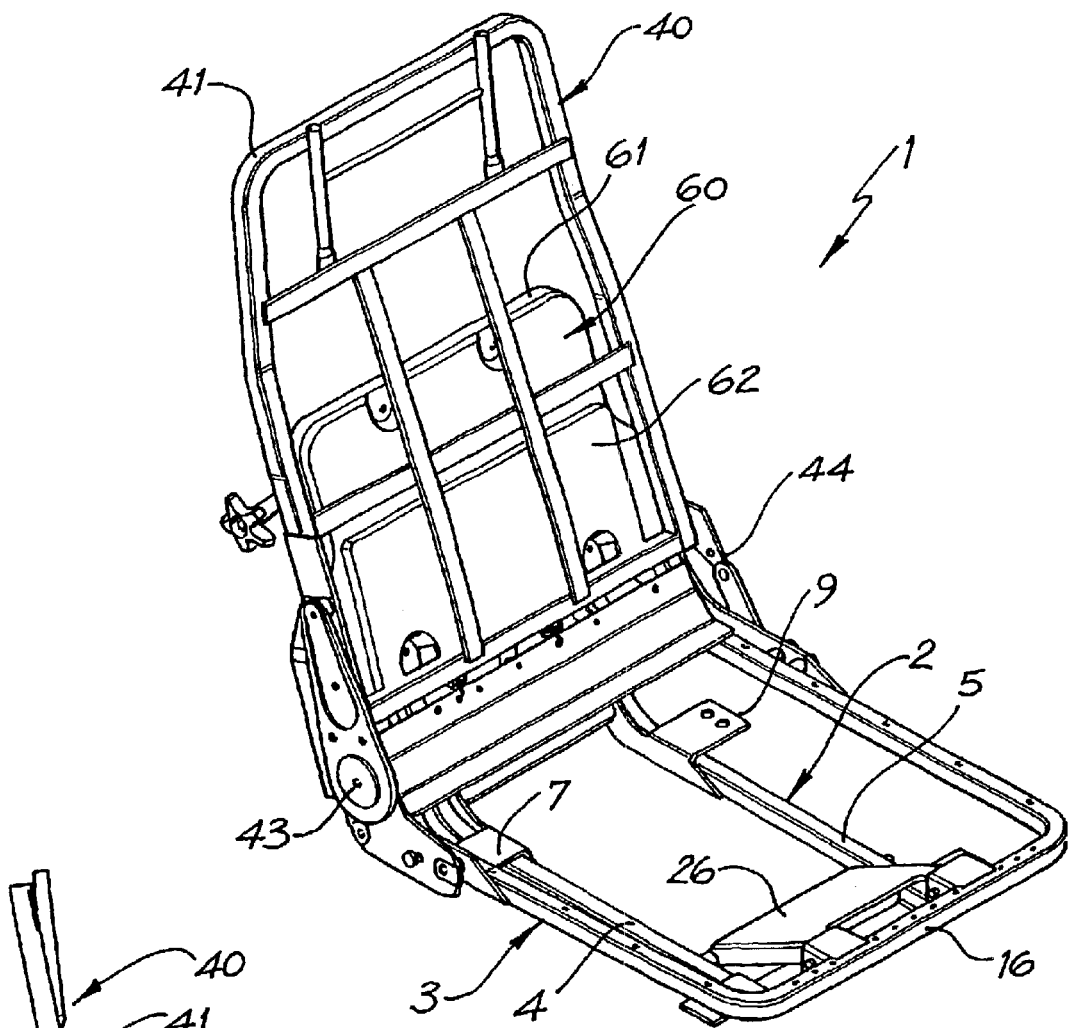
FIG. 6 is a perspective view from above and one side of the suspension seat of FIG. 1, a cover arrangement being in place over the suspension arrangement and the upper frame and lower frame being in an extended position.
Figure 7:
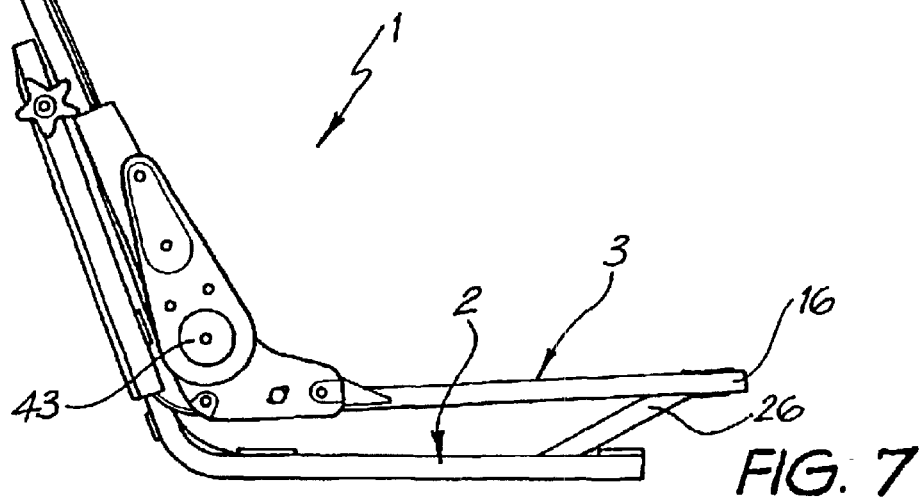
FIG. 7 is a side view of the suspension seat arrangement of FIG. 6.
Figure 8:
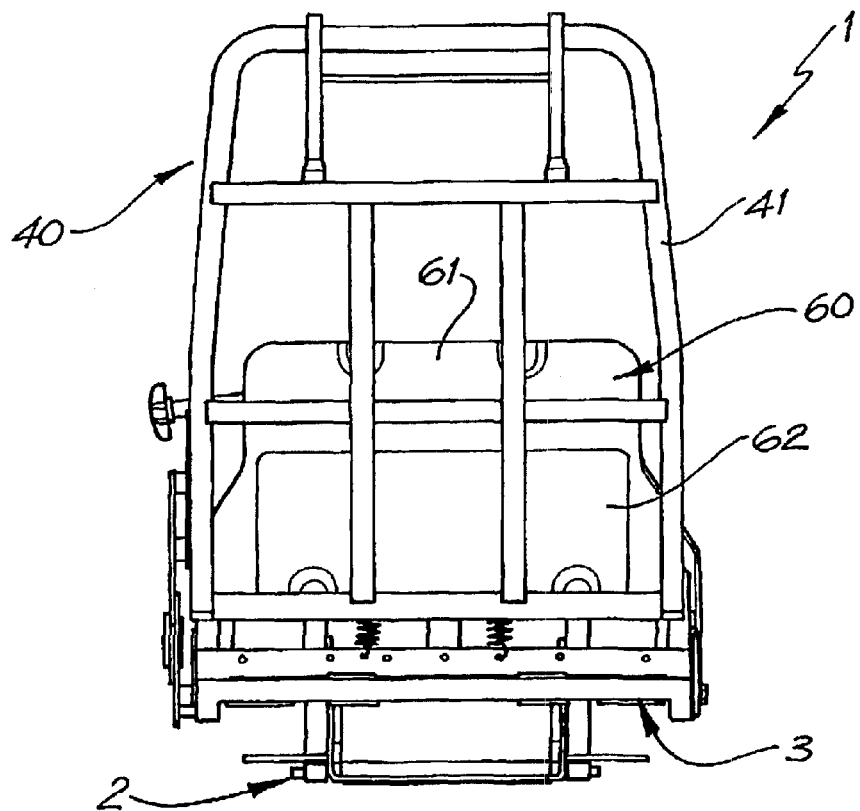
FIG. 8 is a front view of the suspension seat arrangement of FIG. 6.
Figure 9:
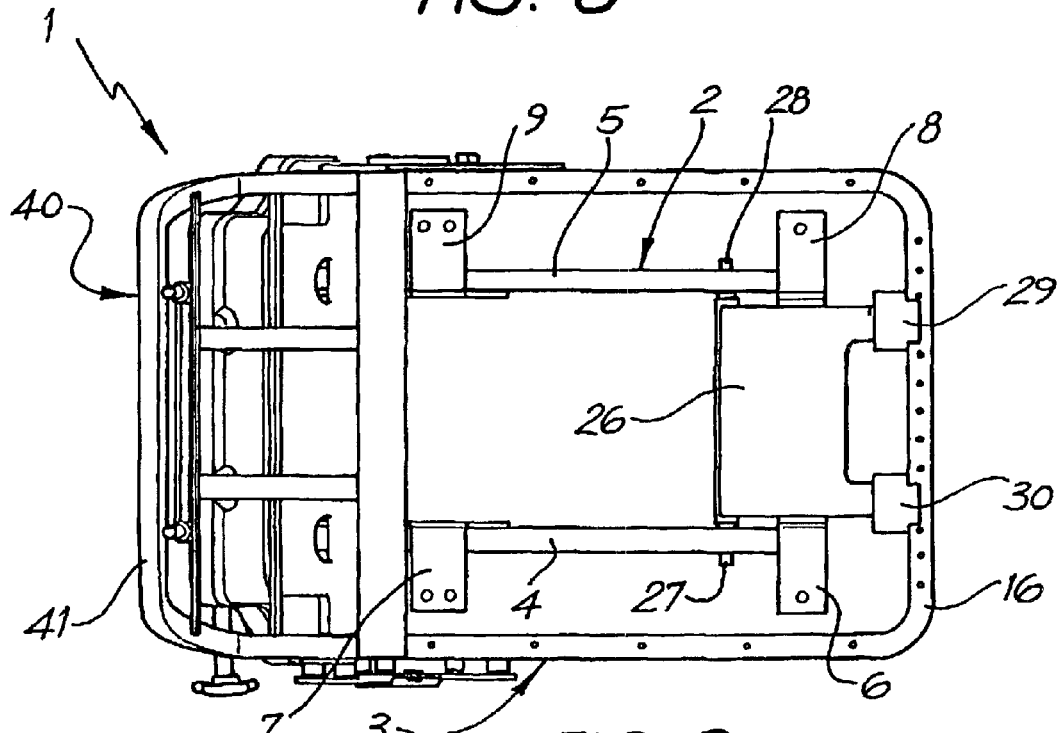
FIG. 9 is a top view of the suspension seat arrangement of FIG. 6.

The upper frame 3 and lower frame 2 are arranged such that the frame 3 can move down over the lower frame 2, as shown in FIG. 4. The frame member 16 comes right down over the lower frame bars 4 and 5, as can be seen so that the lower frame 2 becomes substantially nested within the upper frame 3. This arrangement allows for maximum travel between the upper frame 3 and lower frame 2, and also means that less space is taken up in the vehicle by the range of travel between the upper frame 3 and lower frame 2. FIG. 7 shows the upper position of the seat, ie maximum extent travel between the upper frame 3 and lower frame 2. FIG. 7 and FIG. 8 also illustrate the extent of travel between the upper frame 3 and lower frame 2.

In this embodiment, the width of the lower frame 2 is arranged to be narrower than the width of the upper frame 3 so that the lower frame 2 can nest within the upper frame 3. Further, the raised cross bar 17 at the back of the upper frame 3 allows the nesting to occur.

Suspension linkage arrangement 18 comprises a supporting link 50 which includes holes 51A, 52A mounting one end of the suspension springs 19 and 20. Link 50 is hingeably mounted to supporting link 51, by hinge arrangement 52. A further hinge 53 mounts supporting link 51 to a bracket 54 which is mounted to bar 13 on the suspension sub-frame 11. Link 50 is supported via link 51 and bracket 54 by the suspension sub-frame 11. Adjustment arrangement 55 comprises a handle 56 and shaft 57 which is connected to the supporting link 51 by hinge 58. On rotation of the handle 56, shaft 57 extends or retracts due to a screw arrangement (not shown) and causes link 51 to rotate about hinge 53 and thereby moves link 50 to increase or decrease tension on springs 19, 20. Adjustment arrangement 55 is arranged as shown so that handle 56 extends from the side of the seat arrangement, which enables adjustment of the suspension from the side and also facilitates minimising the depth dimension of the back of the seat arrangement.

Suspension sub-frame 11 is preferably of relatively thin cross section, to minimise the depth dimension of the back of the seat arrangement, again to reduce the amount of space taken up in, for example, a vehicle.

The cushion frame 16 preferably supports a resilient webbing or spring mattress (not shown). This resilient platform allows additional energy absorption in conjunction with the suspension arrangement.

Suspension arrangement 12 and suspension frame assembly 11, if exposed, have a number of sharp edges which could easily cause injury within the confined spaces of a vehicle, both to the person sitting on the seat arrangement and possibly also persons sitting behind the seat arrangement. FIGS. 6 through 9 illustrate a cover arrangement 60 which covers the suspension sub-frame 11, suspension arrangement 12, roller channel members 34 and 33 and also bars 31 and 32. The cover arrangement 60 comprises a back cover section 61 and a front cover section 62. The back cover section 61 essentially covers components which are mounted proximate to the lower frame 2 and the front cover assembly 62 covers components which are proximate to or part of the upper frame 3.

The suspension seat arrangement of this embodiment may be mounted as illustrated, in a vehicle, such as a military vehicle or an industrial vehicle, and provided with front and back cushions. The suspension seat arrangement disclosed can also be used to provide suspension to a vehicle seat which did not previously have suspension. In such a case, seat back 40 may not be required and can be removed. All that is fixed into the vehicle is the upper frame 3, lower frame 2, and suspension arrangement 12. The seat which previously had been fitted in the vehicle can then be attached to the frame 3, in other words, adapting that seat to provide it with suspension.

Note that the seat arrangement of the present invention is not only for use in military vehicles or industrial vehicles. It could be used for any type of vehicle, train, bus, domestic car and others. Further, it is not limited for use on vehicles, it could be used on airplanes and other types of transport. It could also be used as a suspension chair in a stationary mounting, eg waiting room, domestic house chair.

The suspension arrangement as disclosed in the preferred embodiment discussed above includes a pair of springs to provide the suspension. Other means could be used to provide the suspension.

In the described embodiment, the lower frame is narrower than the upper frame, which enables the upper frame to come down over the lower frame. Other configurations of the upper frame and lower frame could enable the upper frame and lower frame to be substantially nested together. For example, the lower frame could be wider than the upper frame, so that the upper frame becomes received within the lower frame. Similarly, the frame configurations could be different from the configurations shown in the preferred embodiment.

In the suspension arrangement of the embodiment described above, standard springs are used to provide the suspension. It will be appreciated that other types of suspension may be utilised. For example, in an alternative embodiment, instead of conventional springs, a pneumatic air spring or springs may be utilised.

It will also be appreciated that the suspension arrangement described above is not the only arrangement that can be applied to suspend the upper frame with respect to the lower frame. Other arrangements may be used e.g. an arrangement of springs directly between the upper frame and lower frame.

Further, it will also be appreciated that the upper frame and lower frame configuration need not be exactly as described with reference to the drawings. Different types of frame arrangements maybe implemented.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A suspension seat arrangement, comprising a lower frame which is mountable to a seat mounting, an upper frame including a seat base portion and a back portion, the upper frame being connected to the lower frame and movable with respect thereto, and a suspension arrangement suspending the upper frame with respect to the lower frame, the upper frame and lower frame arrangement being such that the upper frame is able to move downwardly relative to the lower frame so that the upper frame and lower frame become nested together one within the other.

2. A suspension seat arrangement in accordance with claim 1, wherein the suspension arrangement is mounted at the rear of the seat, and has a relatively thin cross section so the width of the rear of the seat is minimised.

3. A suspension seat arrangement in accordance with claim 1, further comprising a suspension adjustment mechanism for adjusting the tension of the suspension arrangement.

4. A suspension seat arrangement in accordance with claim 3, wherein the suspension adjustment mechanism includes an adjustment control which is adjustable from a side of the seat arrangement.

5. A suspension seat arrangement in accordance with claim 1, including a cover arrangement covering the suspension arrangement.

6. A suspension seat arrangement in accordance with claim 5, wherein the cover arrangement comprises a relatively rigid housing within which the suspension arrangement is mounted.

7. A suspension seat arrangement in accordance with claim 1, wherein the upper frame includes a resilient platform for mounting a cushion, the resilient platform providing further energy absorption in addition to energy absorption provided by the suspension arrangement.

8. A suspension seat arrangement in accordance with claim 1, wherein the lower frame is narrower than the upper frame, and the arrangement is such that the upper frame can travel downwardly over the lower frame, so that the lower frame becomes nested within the upper frame.

9. A method of modifying a seat to provide suspension to the seat, comprising the step of mounting the seat to a suspension seat arrangement in accordance with claim 1.

10. A method in accordance with claim 9, wherein the seat is a vehicle seat, and comprising the further step of removing the seat from the vehicle, before mounting the suspension to the vehicle then replacing the seat.

* * * * *